Aug. 18, 1936.  C. R. KITTLE ET AL  2,051,088
BRAKE FOR MOTOR VEHICLES
Filed Sept. 17, 1934   4 Sheets-Sheet 1

Inventors
C. R. Kittle
J. R. Kittle
by Hagard and Miller
Attorneys.

Aug. 18, 1936.   C. R. KITTLE ET AL   2,051,088
BRAKE FOR MOTOR VEHICLES
Filed Sept. 17, 1934   4 Sheets-Sheet 2

Inventors
C. R. Kittle
J. R. Kittle
By Hazard and Miller
Attorneys.

Aug. 18, 1936.　　　C. R. KITTLE ET AL　　　2,051,088
BRAKE FOR MOTOR VEHICLES
Filed Sept. 17, 1934　　　4 Sheets-Sheet 3

Inventors
C.R.Kittle
J.R.Kittle
by Hazard and Mille
Attorneys.

Aug. 18, 1936.　　　　C. R. KITTLE ET AL　　　2,051,088
BRAKE FOR MOTOR VEHICLES
Filed Sept. 17, 1934　　　4 Sheets-Sheet 4

Inventors
C. R. Kittle
J. R. Kittle
by Hazard and Miller
Attorneys.

Patented Aug. 18, 1936

2,051,088

UNITED STATES PATENT OFFICE 2,051,088

BRAKE FOR MOTOR VEHICLES

Charles R. Kittle, Elsinore, and James R. Kittle, Van Nuys, Calif.

Application September 17, 1934, Serial No. 744,320

17 Claims. (Cl. 188—106)

Our invention relates to a combination hydraulic or mechanically operated brake in which the hydraulic brake is intended to be the service brake and the mechanical brake an emergency or parking brake, but if desired, both brakes may be simultaneously operated to increase the braking action, or, if for any reason the hydraulic brake fails, the mechanical brake can be brought into action.

One of the objects and features of our invention is to simplify the re-lining of the brakes by having readily insertable and removable brake shoes each with a brake lining thereon which can be removed from the assembly without taking down the brake or removing the wheel from the vehicle by simply removing cover plates which are mounted on a disk secured to the vehicle axle or other fixed structure. After removal of these cover plates, the two brake shoes may readily be detached from what we term pressure shoes and removed for re-lining or working on the lining.

Another feature of our invention relates to the use of somewhat freely floating or moving pressure shoes to which the brake shoes are attached at central pivoting points of the pressure shoes, these points being diametrically opposite so that on outward or inward movement of the pressure shoes on a diametrical line the brake shoes may be operated also on a diametrical line with pressures transmitted evenly in a radial direction the full length of the brake shoes. This latter feature is accomplished by having a cylindrical surface contact between the pressure shoes and the brake shoes.

Another feature of our invention relates to the use of substantially pivoted pressure levers, there being two employed for a brake having two shoes, and these levers are simultaneously operated by a hydraulic device, this latter being preferably a hydraulic cylinder and piston.

Therefore, another object and feature of our invention is the employment of a hydraulic piston and cylinder assembly which is mounted in a loose or floating manner in the brake assembly and utilized to actuate the pivoted pressure levers which levers react on the pressure shoes and press these outwardly in diametrical directions. The pressure shoes with the brake shoes secured thereto are drawn inwardly by retraction springs.

Another object and feature of our invention relates to the mechanical application of the brakes which is accomplished by a mechanically operated lever in the form of a wedge. The wedge shaped lever has a link connection to one of the pressure levers and by a reaction through the hydraulic cylinder and piston, operates the other pressure lever, this second lever being pivotally connected at one end to a fixed pivot, whereas, the end of the first designated pressure lever is connected at one end to the hydraulic pressure device and at its other end by the link connected to the wedge shaped lever.

Another feature of our invention relates to a quick and easy manner of adjusting the brakes by changing the location of an adjusting cam which reacts with a wedge surface on the mechanical power transferring lever and thus may be utilized to set the initial position of the end of the first pressure lever which has the link connected to the wedge shaped lever.

Another object and feature of our invention in a modified or alternative construction is in employing an equalizing lever which inter-connects between the pressure levers and the pressure shoes. Each equalizing lever is mounted to have a rocking motion on its pressure lever by a fulcrum which is located at the center of the pressure lever and at substantially the center of the pressure lever. These fulcrums are located diametrically opposite in the brake.

Another object and feature of our invention is the employment of an anti-rattling device engaging respectively in one form, the pressure shoes and the pressure levers, or, in the other form, the pressure shoes and the equalizing levers.

Other detailed features of our invention relate to the employing of guide blocks and guide shoes which confine the movement of the pressure shoes to that in diametrical lines.

Our invention is illustrated in connection with the accompanying drawings, in which.

Figure 1:
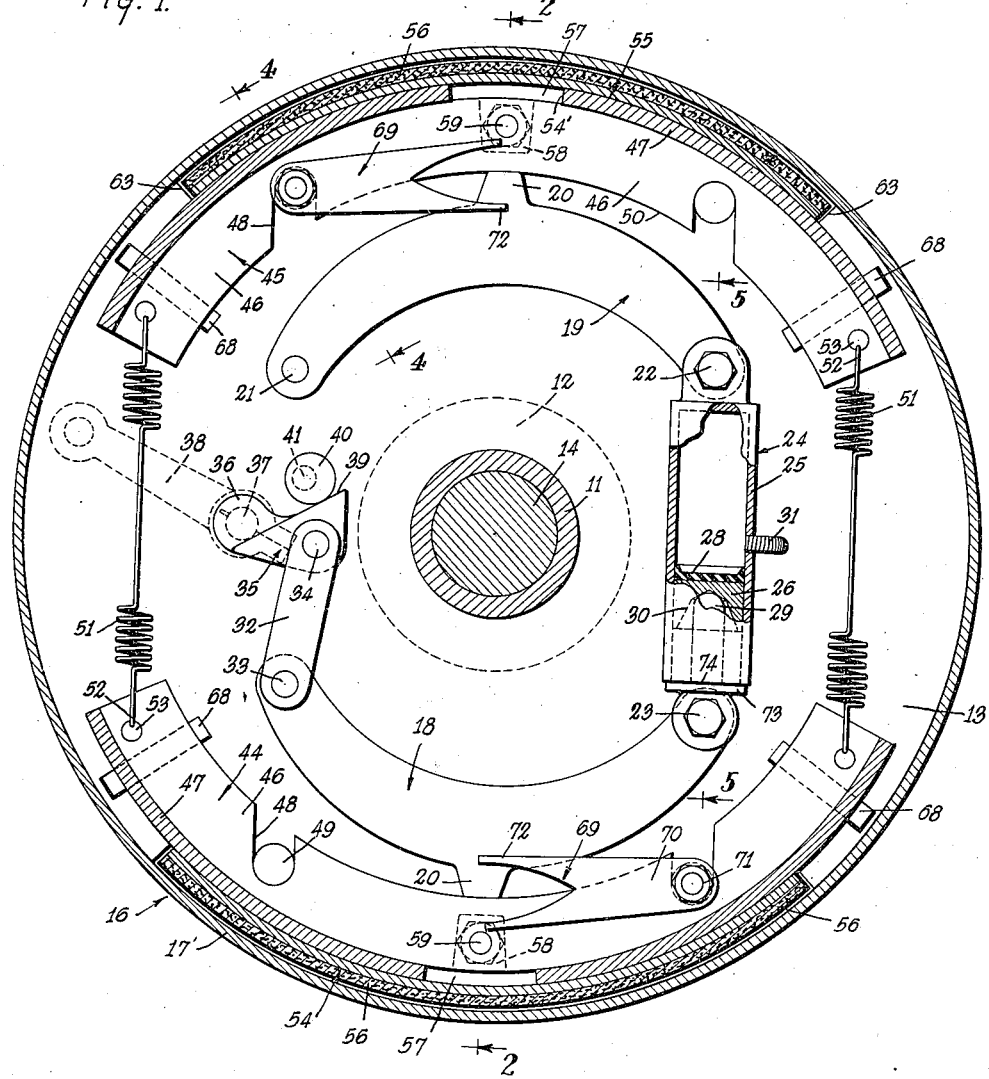
Fig. 1 is a longitudinal section on the line 1—1 of Fig. 2 in the direction of the arrows.
Figure 2:
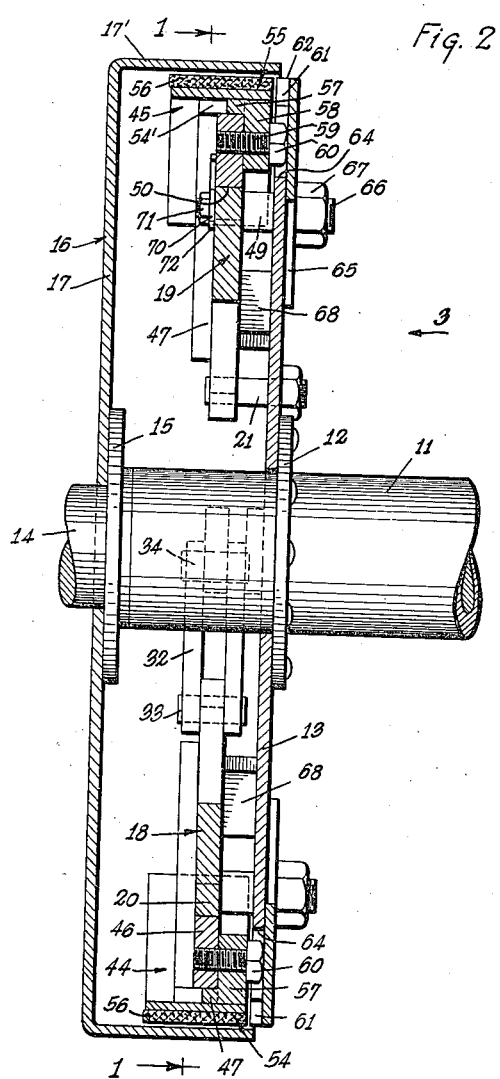
Fig. 2 is a transverse section on the line 2—2 of Fig. 1 in the direction of the arrows.
Figure 4:
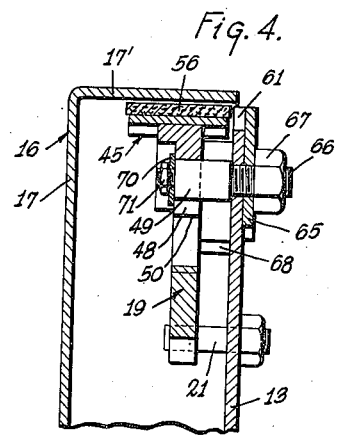
Fig. 4 is a radial section on the line 4—4 of Fig. 1 in the direction of the arrows.
Figure 5:
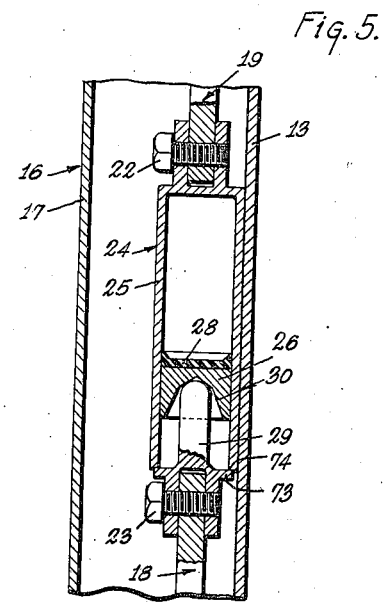
Fig. 5 is a transverse section on the line 5—5 of Fig. 1 in the direction of the arrows showing the hydraulic pressure cylinder and piston assembly.
Figure 3:
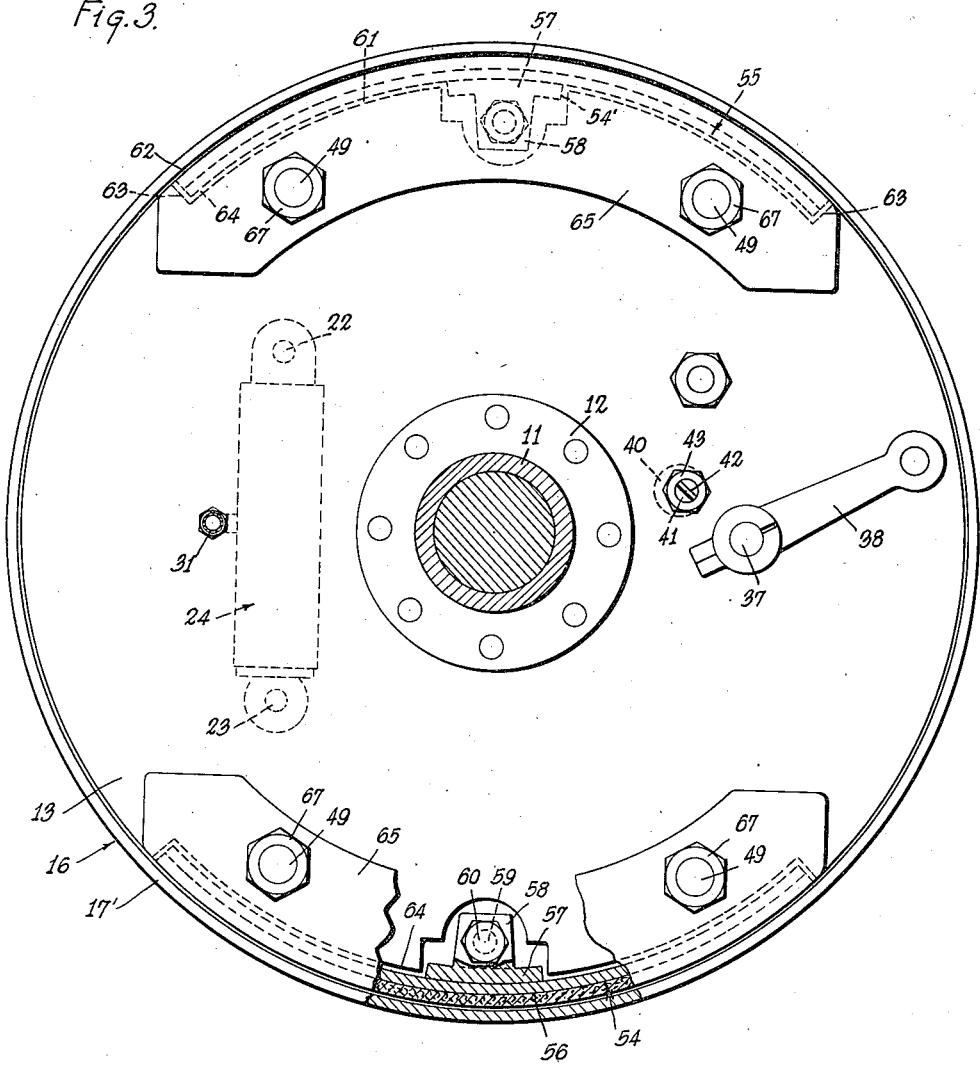
Fig. 3 is a side elevation taken in the direction of the arrow 3 of Fig. 2 with certain parts broken away.

In the drawings a fixed axle or axle housing is designated by the numeral 11 which has a flange 12 to which is secured a stationary disk 13. The rotating axle or part of a wheel is designated by the numeral 14 this having a flange 15 secured thereto to which is connected the brake drum 16 which has a disc 17 and a cylindrical drum section 17'. These may be more or less of a conventional construction. The fixed disk 13 forms a support and mounting for the operative parts of the brake assembly.

Referring first to the construction of Figs. 1 through 4:

We provide what we term first and second pressure levers 18 and 19, these being shown as arcuate in shape, having a concaved side towards the axle of the convex side outwardly. On the outside edge there is a knub 20 on each lever at substantially diametrically opposite positions. The lever 19 is pivoted to a stud 21 which is secured to the disc 13. This may be considered as a fixed end of this lever. Pivot bolts 22 and 23 connect the opposite end of the lever 18 and a smaller end of the lever 19 to a hydraulic cylinder and piston assembly designated 24. This assembly employs a cylinder 25 in which operates a piston 26, there being a packing ring 28, a piston rod 29 bearing in a socket 30 of the piston. The bolt 22 is connected to the cylinder and the bolt 23 is illustrated as connected to the piston rod. Manifestly, these could be reversed. A flexible tube 31 connects to the cylinder at one side thereof and located well inside any possible inward position of the piston in the cylinder. The ends of the pressure levers connected by the bolts 22—23 may be considered as the free ends of these levers as these are free to move under the action of the hydraulic piston assembly in the direction of the brake.

A link 32 is connected to the opposite end of the lever 18 from the bolt 23 and extends in a direction towards the fixed pivot stud 21. The pivot on the link 18 is indicated at 33. A pivot pin 34 connects the link 32 to a mechanically actuated wedge shaped lever 35. This lever is formed integral with a head 36 which is connected to a short rock shaft 37, this shaft having a bearing in the disk 13 and being connected to an arm 38, which arm may be connected to and operated by a manually actuated brake device such as the hand lever used for the parking or emergency brakes.

An adjusting feature and construction of the brakes is made by providing the lever 35 with a sloping or wedging surface 39 which is contacted by adjusting cam 40 mounted on an adjusting stud 41. This stud extends outwardly through the disks 13, and has a screw driver kerf 42 on its outer end and a lock nut 43. By this means the lock nut may be loosened and the stud with the cam rotated to a desired position thus shifting the position of the lever 35, the link 32 and pressure levers 18 and 19.

Slidably mounted within the brake drum there are two pressure shoes designated 44 and 45. These are of a similar construction having a web 46 with an L-head flange 47, the flange being made cylindrical and concentric with the brake drum. Each web is provided with a slot 48 parallel to a diametrical line and each slot engages a guide stud 49 extending inwardly from the disk 13 to which it is secured. The knubs 20 bear on the inner concave edge 50 of these pressure shoes. The pressure shoes and the brake actuating mechanism are retracted by a pair of retraction springs 51, each having a hook end 52 engaging in an eye 53 at the ends of the pressure shoes. The flange 47 is cut away at the center portion as indicated at 54.

There are two brake shoes 54 and 55 each being formed of a metal strap bent in an arcuate curve concentric with the brake drum and on the convex surface of each shoe there is secured the brake lining 56, this being attached in any suitable manner. Each brake shoe has a block 57 attached thereto at the edge adjacent the disk 13, this block being accommodated in the cut-out section 54 of the flange 47.

A lug 58 extends inwardly from the block 57 and each lug is secured to the center portion of the web section of each pressure shoe by a screw 59 having a wrench grip head 60. This has a sufficiently loose attachment so that the concave surface of each brake shoe strap fits snugly against the outside convex curve of the flange head 47 of each pressure shoe.

In order to provide for accessibility of the brake shoes and lining and their removal, the disk 13 is provided with openings 61 diametrically opposite. These openings are defined by the marginal edge 62 of the disk, radial lines 63, and an inner curved edge 64 concentric with the circular edge of the disk. A segmental plate 65 of the same shape as the opening 61 in each disk but slightly longer in a circular direction and also in a radial direction is clamped to the disk by the threaded end 66 of the studs 49, the nuts 67 being threaded on this threaded end and thus holding the removable plates over the openings. The plates are thus held by two nuts which on removal, expose the opening 61 so that by removing the screws 59 by their wrench grip heads 60, the brake shoes with their linings may be removed through these openings 61 to allow work to be done on the linings or re-lining job to be done.

In order to maintain the pressure shoes 44 and 45 spaced from the disk 13 there are spacing blocks 68 attached to the web sections of these pressure shoes, thus holding the pressure shoes the correct distance from the disk 13.

We provide anti-rattling devices designated by the assembly numeral 69. Each has a strap 70 and is attached to one of the studs 49 by means of a screw 71 threaded on the stud. The strap has a pair of prongs 72, one of which engages the web of the pressure shoe at substantially its mid position and the other engages the pressure lever at substantially the center and base of the knub 20.

The manner of operation and functioning of our invention so far described in connection with Figs. 1 through 5 is as follows:

As above mentioned the brake shoes may be assembled in position by removing the protective cover plates from the disk. When properly located they have a cylindrical bearing on the pressure shoes 44 and 45 which may have a movement in the line of a diameter through the mid position of each shoe. The cam 40 on the stud 41 may be adjusted as to its bearing on the sloping wedge surface 39 of the lever 35 which adjusts the relative position of the pressure levers 18 and 19. The pressure shoes and brake shoes are retracted normally by the retraction springs 51.

When the device is used as a hydraulically actuated brake the flow of hydraulic fluid in the cylinder under pressure causes a reaction in which the cylinder moves in one direction and the piston in the opposite direction. The pressure lever 19 therefore pivots outwardly on the pivot 21 and the lever 18 is pressed outwardly on the fulcrum provided by the link 32 and its pivotal connections 33 to the pressure lever and 34 to the mechanically operated lever. This action causes the knubs 20 to press outwardly on a substantial diameter line of the inner side of the prior shoes and thus force the brake lining into contact with the brake drum.

When the brake is used as a mechanically actuated brake, the cylinder will have hydraulic fluid under pressure normally therein, then operating the arm 38 and the lever 35 causes a thrust on the link 32 thus forcing the pressure lever 18 outwardly. This exerts a reaction through the cylinder and piston assembly 24, forcing the pressure lever 19 outwardly and thus mechanically applying the brake shoes on opposite sides of the drum. In order to apply the brakes should the hydraulic fluid fail and thus make a mechanical application necessary, the piston 29 is provided with an abutment ring or shoulder 73, which, when the piston is in its innermost position, engages the edge 74 of the cylinder at its open end. Therefore, a direct pressure is exerted by this shoulder through the cylinder to the pressure lever 19. It is obvious that both the hydraulic application of the brakes may be made and at the same time, a mechanical pressure exerted by operating the arm 38 and thus obtain the benefits of an increased braking pressure.

Figure 6:
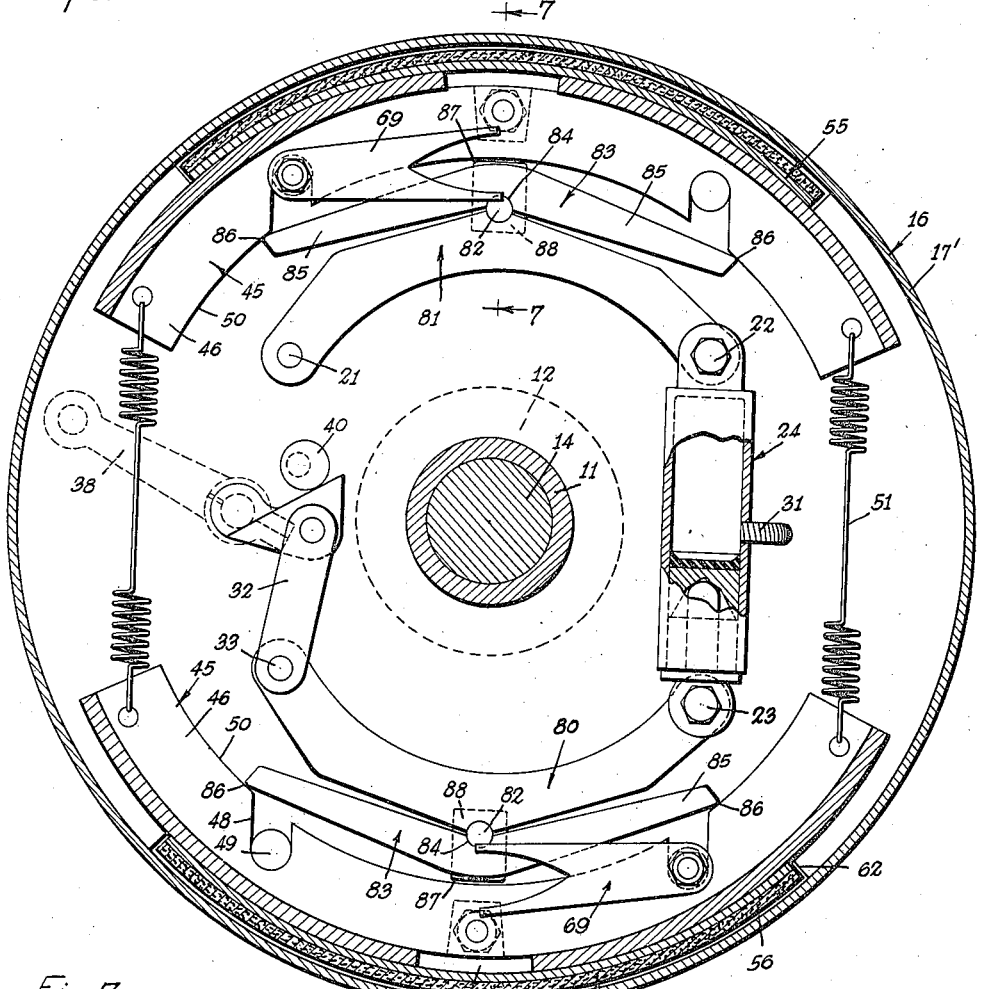
Fig. 6 is an alternative construction of a view being similar to Fig. 1.
Figure 7:
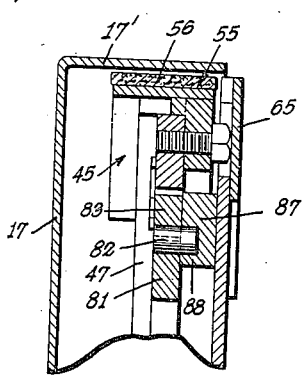
Fig. 7 is a transverse section on the line 7—7 of Fig. 6 in the direction of the arrows.

In the alternative form of our invention illustrated in connection with Figs. 6 and 7 we utilize substantially the same assembly of the brake shoes, the pressure shoes, the hydraulic cylinder and piston assembly and the link connection to one of the pressure links for operating the brakes mechanically. However, in this present construction, the pressure levers 80 and 81 are slightly different in shape and at their center position have a fulcrum bearing 82. Resting on each fulcrum bearing there is an equalizing lever 83. This lever has a circular bearing 84 resting on the fulcrum bearing 82 and has two arms 85, each arm having a tip end 86 contacting the inner concave edge 50 of the pressure shoe. There is a clearance between the apex 86 of each equalizing lever and the center of the concave curve of each pressure shoe. In order to properly space the equalizing lever from the disc 13 a spacing block 87 is attached to the inside of the disk 13. The block has an extension 88 passing behind each pressure lever 80 and 81, maintaining this spaced a correct distance from the disc 13. The same anti-rattling devices 69 are used but in this case one of the prongs contacts the equalizing lever at substantially its fulcrum point.

In the operation of the brake assembly of Figs. 6 and 7 a hydraulic pressure fluid causes the action of the cylinder and piston assembly in the same manner as described in connection with Figs. 1 to 5, moving each pressure lever 80—81 or the brakes may be actuated mechanically by movement of the arm 38. When the pressure levers are forced upwardly they carry the equalizing lever, which on account of having both of its ends bear on the inside edge of the pressure shoes, forces these shoes outwardly and thus bring the brake lining into contact with the inside of the brake drum. There is sufficient looseness in the fit of the studs 49 and slots 48 in both constructions to allow a slight tilting of the pressure shoes and brake shoes to accommodate any eccentricity or departure from a true cylinder of the cylindrical section of the brake drum. Also, to accommodate any irregularity of the brake drum and to give an even pressure transmitted between the pressure levers and the pressure shoes, the equalizing levers are balanced at their centers.

Various changes may be made in the details of construction without departing from the scope of the invention as defined by the appended claims.

We claim:

1. In a brake, the combination of a fixed structure having a first pressure lever pivoted thereto on a fixed fulcrum, a second pressure lever pivoted thereon on a movable fulcrum, a hydraulic pressure device connecting the two levers, a plurality of brake shoes and means for actuating a shoe by one of the pressure levers.

2. In a brake as claimed in claim 1, means to manually shift the fulcrum of the second pressure lever, the said hydraulic device having means to transmit a movement from the second to the first pressure lever.

3. In a brake, the combination of a fixed structure having a first pressure lever connected thereto by a fixed fulcrum, a second pressure lever connected thereto by a movable fulcrum, means to adjust the position of the second fulcrum, a hydraulic pressure device connected to both pressure levers, a plurality of brake shoes, and an operative connection between each lever and a shoe to actuate each of the shoes on pressure operation of the hydraulic device.

4. In a brake as claimed in claim 3, a manually operable lever having a connection to the fulcrum of the second pressure lever and means to mechanically operate said manual lever to actuate the second pressure lever and transmit a movement through the hydraulic device to the first lever.

5. In a brake, the combination of a rotatable brake drum, a fixed disk at one side of the drum, a pair of arcuate shaped pressure levers both having a pivotal connection to the said disk and being located on opposite sides of the center of the drum, a hydraulic device comprising a cylinder and a piston connected to each of the levers, a pair of slidably mounted pressure shoes with guide means therefor to restrict the movement on a diametrical line of the drum, a brake shoe operatively connected to each pressure shoe, a pressure exerting means inter-connecting each pressure lever and each pressure shoe whereby on development of pressure in the hydraulic device the pressure levers are swung outwardly and exert a pressure on the pressure shoes.

6. In a brake as claimed in claim 5, the pivotal connection of one of the pressure levers to the disc including a link and a pivotally mounted secondary lever actuated by a manually operated means.

7. In a brake as claimed in claim 5, the pivotal connection of one of the pressure levers to the disk including a link connected to a secondary lever and an adjusting cam to shift the position of the secondary lever and thereby the pivot point of the pressure lever having the link.

8. In a brake as claimed in claim 5, each brake shoe being detachably connected to its pressure shoe, the said disk having an arcuate slot adjacent each brake shoe with a removable cover plate whereby the brake shoes may be removed through the said slots.

9. In a brake as claimed in claim 5, the pressure exerting means interconnected between a pressure lever and a pressure shoe, comprising a knub on each pressure lever bearing against the adjacent pressure shoe.

10. In a brake as claimed in claim 5, the pressure exerting means interconnecting each pressure lever and pressure shoe comprising an equalizing lever fulcrumed on a pressure lever and bearing at its ends against the adjacent pressure shoe.

11. In a brake, the combination of a rotatable brake drum, a fixed disk at one side of the drum, a manually operated lever pivoted to the disk, a link connected to said lever, a first pressure lever connected to the link, a second pressure lever pivoted to the disk, a hydraulic pressure device including a cylinder and a piston connected between the free ends of the pressure levers, a pair of brake shoes diametrically opposite in the drum and mounted for transverse movement in a diametrical direction and a pressure exerting means between each pressure lever and its brake shoe.

12. In a brake as claimed in claim 11, a cam rotatably mounted on the disk and positioned to bear against the manually operated lever to shift the position of such lever and thereby adjust the relative positions of the two pressure levers.

13. In a brake as claimed in claim 11, the manually operated lever having a wedge surface and an adjusting stud pivotally mounted in the disk and having an adjusting cam to bear on the said surface and thereby adjust the position of the link connected to the first pressure lever.

14. In a brake, the combination of a rotatable brake drum, a fixed disk on one side of the drum, a pair of arcuate shaped pressure shoes located diametrically opposite in the drum, a guide means interconnecting the disk and the said shoes to confine the movement of said shoes in a diametrical direction, a brake shoe connected to each pressure shoe and means to exert an outward pressure substantially in a line parallel to a diameter of the drum to force the pressure shoes and the brake shoes outwardly, the disk having a pair of arcuate slots with a cover plate and a bolt forming a means for attaching a brake shoe to its pressure shoe, the brake shoe on the removal of the bolt being removable through the said slot after removal of the cover plate.

15. In a brake, the combination of a rotatable brake drum, a fixed disk, a rock shaft pivoted to said disk, a manually operated arm connected to said shaft, a lever having a flat edge connected to said shaft, a rotatable stud mounted on the disk and having an adjusting cam engaging the said edge of the lever, a link connected to said lever, a first pressure lever connected to the link at one side of the center of the drum, a second pressure lever pivoted to the disk at the opposite side of the center of the drum, a hydraulic connection between the pressure levers including a hydraulic cylinder connected to one lever and the piston connected to the other, a pair of brake shoes and means to transmit a pressure between each pressure lever and one of the brake shoes.

16. In a brake, the combination of a rotatable brake drum, a fixed disk on one side of the drum, a pair of arcuate shaped pressure shoes located diametrically opposite in the drum, a guide means interconnecting the disk and the said shoes to confine the movement of said shoes in a diametrical direction, a brake shoe connected to each pressure shoe, means to exert an outward pressure substantially in a line parallel to a diameter of the drum to force the pressure shoes and the brake shoes outwardly, the means for exerting an outward pressure on each pressure shoe comprising a pressure lever having a pivotal connection to the disk, and an equalizing lever fulcrumed on each pressure lever, the ends of each equalizing lever bearing on the inside edge of the adjacent pressure shoe.

17. In a brake, the combination of a fixed structure, a first pressure lever having a pivotal connection to said structure, a second pressure lever directly pivoted to said structure, a hydraulic pressure device connected to both levers, means to operate said device to give an outward movement to both of said levers, the first lever turning on its pivotal connection to the fixed structure and the second lever on its direct pivot connection to the fixed structure, a pair of pressure shoes, a brake shoe with lining attached to each pressure shoe, a rotatable brake drum outside of the lining, the said pressure shoes being located on diametrically opposite sides of the drum, a pressure exerting means between each pressure lever and its pressure shoe, and a manually operable means to actuate the pivotal connection of the first lever whereby pressure may be transmitted from the first lever through the hydraulic device to the second lever and thereby to the pressure shoes actuated by both levers.

CHARLES R. KITTLE.
JAMES R. KITTLE.